United States Patent
Mikkilineni et al.

(10) Patent No.: US 8,990,290 B1
(45) Date of Patent: Mar. 24, 2015

(54) NETWORK MODEL FOR DISTRIBUTED COMPUTING NETWORKS

(76) Inventors: Rao V. Mikkilineni, Cupertino, CA (US); Albert A. Comparini, Los Altos, CA (US)

(\*) Notice: Subject to any disclaimer, the term of this patent is extended or adjusted under 35 U.S.C. 154(b) by 289 days.

(21) Appl. No.: 12/869,510

(22) Filed: Aug. 26, 2010

Related U.S. Application Data

(60) Provisional application No. 61/239,734, filed on Sep. 3, 2009.

(51) Int. Cl.
  *G06F 15/16* (2006.01)
  *H04L 12/24* (2006.01)
(52) U.S. Cl.
  CPC ......... *H04L 41/0233* (2013.01); *H04L 41/0893* (2013.01); *H04L 41/042* (2013.01)
  USPC ............. 709/203; 709/218; 717/173; 714/51; 726/1
(58) Field of Classification Search
  USPC ....................... 709/218, 203; 717/173; 714/51
  See application file for complete search history.

(56) References Cited

U.S. PATENT DOCUMENTS

| | | | |
|---|---|---|---|
| 2008/0155643 A1* | 6/2008 | Moran et al. | 726/1 |
| 2009/0044185 A1* | 2/2009 | Krivopaltsev | 717/173 |
| 2009/0077175 A1* | 3/2009 | DeAnna et al. | 709/203 |

\* cited by examiner

*Primary Examiner* — Kyung H Shin
(74) *Attorney, Agent, or Firm* — Ascenda Law Group, PC

(57) ABSTRACT

The invention sets forth a New Network Model for building and managing distributed computing networks based on a fundamental network building block referred to as a DIME; an acronym for Distributed Intelligent, Managed, Entity, and a Signaling Infrastructure. The network model enables dynamic management of the programs comprising the DIME. Five of these programs are used for implementing the functional management services commonly referred to as Fault, Configuration, Accounting, Performance and Security, or FCAPS, at the DIME level. A combination of FCAPS management and Signaling Infrastructure enables DIME based Workflows, which are groups of connected DIMEs programmed to execute in coordination with each other to produce desired results. The network model further enables basic Workflow requirements, including those of task specialization; priority based mediation; fault tolerance; reliability; and resiliency.

23 Claims, 4 Drawing Sheets

WORKFLOW WITH MULTIPLE PATHS

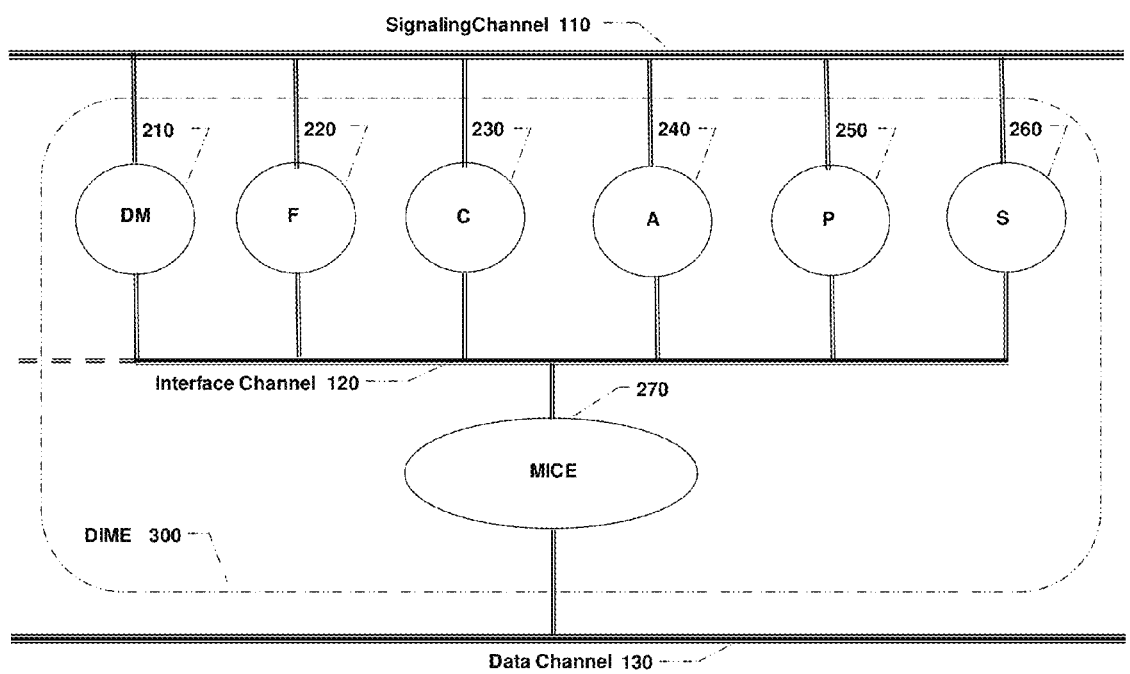
Figure 1
DIME
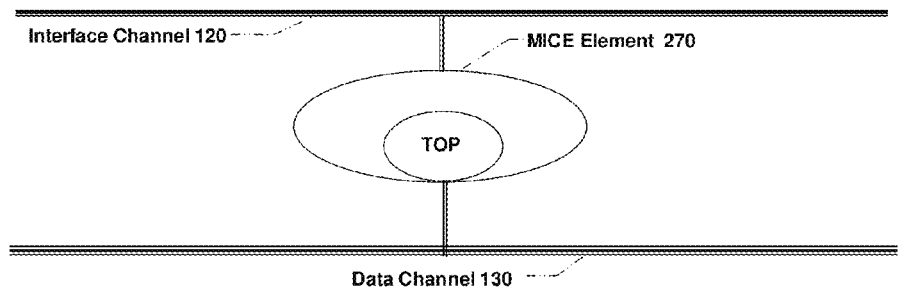
TOP (a program in the MICE Element)

WORKFLOW WITH ASSOCIATED SIGNALING DIMEs

D1 THROUGH DN EACH REPRESENT A DIME 300

THE NUMBER DESIGNATIONS FOR THE SIGNALING DIMEs ARE:
DIMESp 410, DIMEAm 420, DIMEAl 430, DIMEMe 440

WORKFLOW WITH MULTIPLE PATHS

ILLUSRATION OF A WORKFLOW HIERARCHY

NETWORK MODEL FOR DISTRIBUTED COMPUTING NETWORKS

RELATED APPLICATIONS

The present application is a NONPROVISIONAL of and claims priority to U.S. Provisional Application 61/239,734 filed Sep. 3, 2009.

FIELD OF THE INVENTION

In general, the present invention relates to computer software, and more particularly, to a software object model for building and managing distributed computing, networks.

BRIEF DESCRIPTION OF THE INVENTION

The invention is a model, referred to as a New Network Model, for building and managing distributed computing networks, comprised of a novel, fundamental network building block, referred to as a DIME; an acronym for Distributed Intelligent, Managed, Entity, and a novel, communication, command, and control infrastructure that is used to manage groups of the DIMEs. Distributed computing networks built and managed with the New Network Model are useful for managing the exchange and storage of data in distributed computing environments. The distributed computing environments include, but are not limited to those of data centers and Cloud Computing systems, where computing resources, comprising servers, switches, routers and data storage, are distributed throughout the computing environment.

Object oriented computing has been used in distributed computing networks since the late 1980s. The Telecommunications Management Network and the Open Systems Interconnection Management Network both use five functional management services commonly referred to as Fault, Configuration, Accounting, Performance and Security, known as FCAPS, together with various forms of signaling in their management systems. The New Network Model incorporates the underlying concepts of Object Oriented Programming, FCAPS management, and signaling.

In a preferred embodiment of the invention, the DIME is comprised of programs implementing each of the five FCAPS functional management services; a managed intelligent computing entity (MICE) program having the capability to load, execute and control a task oriented program (TOP) that accomplishes a specific computational task necessary to the desired performance of some portion of the distributed computing network, and; a a program that manages the instantiation of, and communication among the programs comprising the DIME.

Communication, command and control signals are exchanged among the programs within the DIME via data buses.

The communication, command and control signals exchanged among the FCAPS programs within the DIME cause the FCAPS programs to provide functional management services to the TOP. The functional management services provided to the TOP are in accordance with preprogrammed polices resident in the FCAPS programs and activated by the appropriate signals. The services comprise: i) monitoring, reporting, and logging of the usage, performance, and functional errors of the TOP; ii) loading, deleting and reconfiguring the TOP, and; iii) providing authentication and other security functions to the TOP.

In the New Network Model, a distributed computing network is comprised of groups of interconnected DIMEs. The DIMEs of each group are programmed so that the TOPs execute in coordination with each other to produce a desired result.

In a preferred embodiment of the invention, the TOPs of four DIMEs are each programmed to provide an addressing, alerting, supervising or mediating signaling service to the DIMEs in the group. The three data channels and the DIMEs that provide addressing, alerting, supervising, and mediating services are collectively referred to as the Signaling Infrastructure.

Other embodiments of the invention may use one or more signaling services including, but not limited to, one or more of the signaling services referred to above as addressing, alerting, supervising, or mediating services.

The New Network Model's incorporation of FCAPS functions and the Signaling Infrastructure provides many advantages to distributed computing networks, including: reliability and resiliency in process implementation; the ability to dynamically change resource allocation in a distributed computing network, such as in a data center; without interrupting its computational processes, and; scalability.

BRIEF DESCRIPTION OF THE DRAWINGS

The drawings illustrate both the design and utility of preferred embodiments of the disclosed inventions.

FIG. 1 illustrates the DIME, the DIME Elements, and the New Network Model Signaling Channel, Interface Channel, and Data Channel.

FIG. 2 (*b*) illustrates a complex workflow example comprising serial and parallel paths.

DETAILED DESCRIPTION OF PREFERRED EMBODIMENTS

Figure 2:
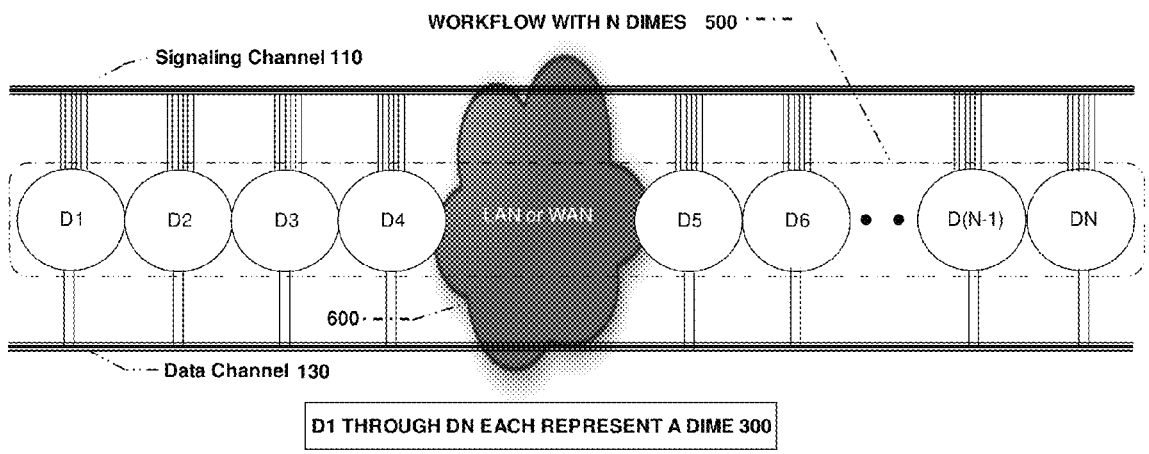
FIG. 2 (*a*) illustrates a Workflow and its associated Signaling DIMEs.
Figure 2:
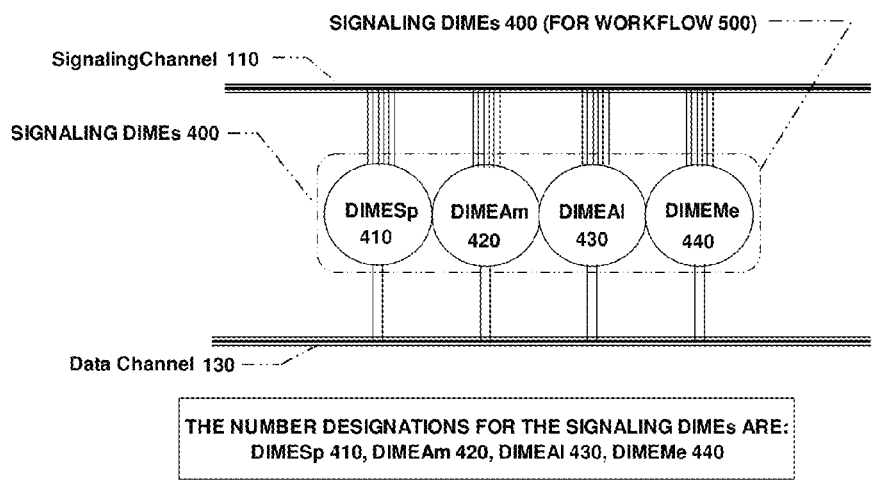
Figure 2:
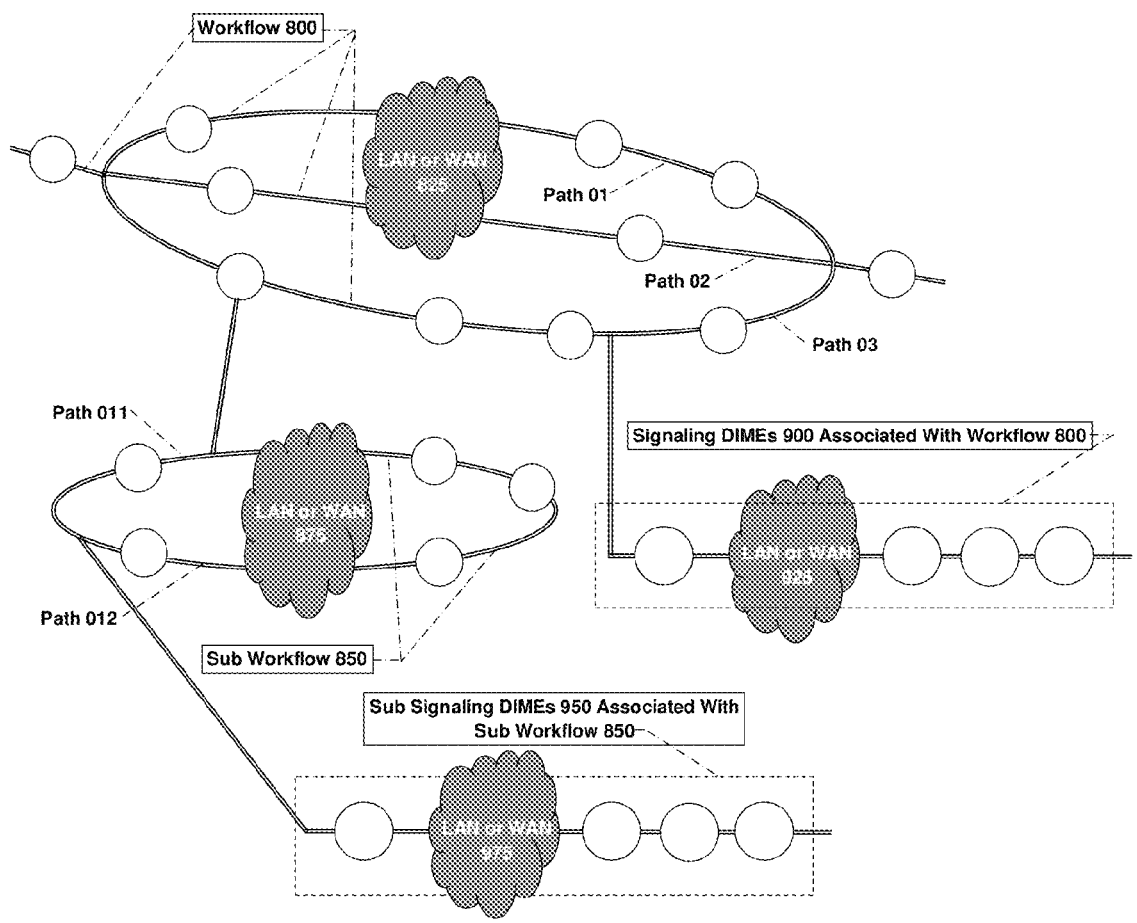

In the following description, for the purposes of explanation, numerous specific details are set forth in to provide an understanding of the present invention.

The following descriptions of the DIME 300 refer to the illustration shown in FIG. 1. As illustrated in FIG. 1, the DIME 300 comprises seven programs, each known as an "Element". Element designations of F 220, C 230, A 240, P 250, and S 260 are abbreviations for Fault, Configuration, Accounting, Performance, and Security respectively. These five Elements are collectively known as FCAPS Elements 220, 230, 240, 250, 260. Element designation DM 210 in FIG. 1 is an acronym for DIME Manager, and; the Element designation MICE 270 in FIG. 1 is an acronym for Managed Intelligent Computing Entity.

The seven Elements are collectively referred to as DIME Elements 210, 220, 230, 240, 250, 260, and 270. The DIME Elements 210, 220, 230, 240, 250, 260, and 270 are all interconnected via a data bus, known as the Interface Channel 120. The Interface Channel 120 serves both as an interface among the DIME Elements 210, 220, 230, 240, 250, 260, 270.

In addition to the Interface Channel 120, FIG. 1 illustrates two other data buses designated as the Signaling Channel 110 and the Data Channel 130. Referring to FIG. 1, the FCAPS Elements 220, 230, 240, 250, 260 and the DM Element 210 are each connected to the Signaling Channel 110. The Signaling Channel 110 is a communication path through which communication, command and control signals are exchanged among the FCAPS Elements 220, 230, 240, 250, 260 and the DM Element 210.

Referring to FIG. 1, the MICE Element 270 is connected to the Data Channel 130. The Data Channel 130 is a communication path through which the MICE Element 270 can exchange electronic messages with the MICE Elements 270 of other DIMEs 300 as well as with entities outside of the DIME environment.

A practitioner in the art will appreciate that the Signaling Channel 110, Data Channel 130, and Interface Channel could all reside on a common communication path.

In a preferred embodiment of the New Network Model, and as illustrated in FIG. 1, the Signaling Channel 110, Data Channel 130 and interface channel 120 would be implemented separately to prevent interference among signals flowing to and from the FCAPS Elements 220, 230, 240, 250, 260 and DM Element 210 from interfering with those flowing to and from the MICE Element 270.

Each of the DIME Elements 210, 220, 230, 240, 250, 260, and 270 has a communication port for exchanging information via the Interface Channel 120. The FCAPS Elements 220, 230, 240, 250, 260 and the DM Element 210 have communication ports for sending and receiving information via the Signaling Channel 110. The MICE Element 270 has a communication port for sending and receiving information via the Data Channel 130.

Although not illustrated in FIG. 1, it is understood that each of the DIME Elements 210, 220, 230, 240, 250, 260, and 270 may have more than one Port for exchanging information via each of the Channels 110, 120, 130.

The term DIME Network, as used herein, shall mean a group of DIMEs 300, each of which is connected to a common Signaling Channel 110 and to a common Data Channel 130, in the manner as illustrated in FIG. 2 (*a*). The FCAPS Elements 220, 230, 240, 250, 260 and the DM Element 210 of each DIME 300 in the DIME Network are connected to the Signaling Channel 110; the MICE Element 270 of each DIME 300 in the DIME Network is connected to the Data Channel 130.

Within an individual DIME 300, the DM Element 210 manages the interactions and communications among the DIME Elements 210, 220, 230, 240, 250, 260, 270 and provides services as described below. Creation of a DIME 300 begins with the instantiation of the DM Element 210. The DM Element 210 is instantiated with a unique DIME name, unique DIME IP Address, and a DIME Element Port number for each DIME Element 210, 220, 230, 240, 250, 260, and 270. The DM Element sends the DIME name, DIME IP Address, and DIME Element Port numbers to an address management service. The address management service is a program that assigns a unique identifier, referred to as the DIME Identifier, to the DIME 300, stores the DIME 300 address comprising the DIME name, DIME IP Address, and DIME Element Port numbers, with the DIME Identifier in an address register that resides in the address management service. The address management service sends the address information and DIME Identifier to the DM Element 210. The DM Element 210 then instantiates the other DIME Elements 220, 230, 240, 250, 260, and 270 according to pre-programmed instructions, which include implementing the address and DIME Identifier in each of the DIME Elements 220, 230, 240, 250, 260, and 270. The combination of the DIME name, DIME IP Address, DIME Port numbers, and DIME Identifier uniquely identifies each Element 210, 220, 230, 240, 250, 260, 270 of the DIME 300.

The MICE Element 270 comprises a program that has the capability to load and execute the task oriented program or TOP. The TOP is a program written to accomplish a specific computational task by operating on input data. Completion of the computational task performed by the TOP results in output data necessary to the desired performance of some portion of a distributed computing network; as the network would be implemented using the New Network Model. Examples of computational tasks that the TOP may perform include, but are not limited to, sorting lists; backing up data; preparing reports causing the reading or writing of data from or to a data storage device, transferring data from one storage device to another, and controlling computational tasks of the TOPs of other interconnected DIMEs 300. Other capabilities instantiated into the MICE Element 270 include, but are not limited to deleting, configuring, or re-configuring the TOP.

The TOP is loaded into the MICE Element 270 and may be loaded, executed, deleted, configured, or reconfigured according to commands sent to the MICE Element 270 from the C Element 230. The commands are sent in response to the appropriate communication signals received by the C Element 230 via the Signaling Channel.

The TOP may be loaded into the MICE Element 270 at instantiation of the MICE Element 270, or the TOP may be loaded into the MICE Element 270 at some time after instantiation of the MICE Element 270. A DIME 300 instantiated without a TOP is referred to herein as a "Spare DIME".

The TOP in the MICE Element 270 may be closed and another TOP loaded into the MICE Element 270. Alternatively, the TOP in the MICE Element 270 may be reconfigured to produce a different output, according to commands received by the MICE Element 270 from the C Element 230.

The F Element 220 is a program that monitors the DIME Elements 210, 220, 230, 240, 250, 260, and 270 for error messages. The F Element 220 maintains a log of error messages, and makes the error messages available to other DIMEs 300 in the DIME Network via the Signaling Channel 110. In addition, the F Element 220 sends out a periodic heartbeat signal to the network via the Signaling Channel 110 to indicate that it continues to monitor for error messages.

The C Element 230 is the configuration element which manages the configuration and re-configuration of the MICE Element 270. It receives command messages via the Signaling Channel 110 and sends the appropriate configuration commands to the MICE Element 270 via the Interface Channel 120. The commands can cause the MICE Element 270 to perform a number of different functions. These functions include, but are not limited to, loading a specific TOP, executing the TOP, changing the operating polices of the loaded TOP, stopping or re-starting the execution of the loaded TOP. Messages from the C Element 230 also include addressing commands which specify the addresses which locate the input data and the address or addresses to which the results of the execution of the TOP in the MICE Element 270 are to be sent The A Element 240 is the auditing and accounting element. The A Element 240 monitors the utilization of the DIME Elements 210, 220, 230, 240, 250, 260, and 270. Each Element of the DIME 300 sends information to the A Element 240 identifying the origin, type and time duration of the utilization of the Element. The A Element 240 logs the information and sends the logged information to a storage device for later use, including but not limited to its use for billing purposes.

The P Element 250 is the performance element, which monitors the use of resources by each of the DIME Elements 210, 220, 230, 240, 250, 260, and 270. The resources comprise computing cycles, memory, storage throughput, network bandwidth. Monitoring of the MICE Element 270 by the P Element 250 includes monitoring the usage of the resources by the TOP in the DIME Element 270. The P Element creates a log of the information, and sends the logged information to a storage device where it is stored and may be used, for example, to optimize the usage of the network resources.

The S Element 260 is the security element, which executes security protocols for securing the communication, command and control messages flowing into and out of the DIME Elements 210, 220, 230, 240, 250, 260, and 270. In addition to securing communications among the DIME Elements 210, 220, 230, 240, 250, 260, and 270, the functions of the S Element 260 include, but are not limited to authentication of data flowing into and out of the DIME 300, and establishing and managing secure communication channels to and from the DIME 300, comprising those based on various encapsulation and encryption technologies.

A Workflow is a set of one or more DIMEs 300 within the DIME Network in which the MICE Element 270 of each DIME 300 in the set is programmed so that its TOP executes in coordination with respect to the execution of the other TOPs of the DIMEs 300 in the set.

An execution of the TOP in the MICE 270 of a DIME 300 shall be referred to herein as a DIME Execution.

The coordinated DIME executions comprise multiple DIME Executions of one or more DIMEs 300 in the Workflow either in succession or separated by the DIME Executions of other DIMEs 300 in the Workflow. In addition, the coordinated executions may have DIME Executions taking place in series or parallel combinations. The purpose of the Workflow is to achieve a certain outcome that requires the coordinated DIME Execution of the DIMEs 300 in the Workflow.

A practitioner of ordinary skill in the art will appreciate that the inclusion of the S Element 260 in the DIME 300 enables security protocols to be implemented at the most basic level of a DIME Network and of a DIME Workflow. The implications for Network design include, but are not limited to, providing unique levels of security to each DIME 300 in a Workflow. This is accomplished by programming each DIME's S Element 260 with unique security protocols. By providing a mechanism for customization of data security at all levels of a distributed computing network, the New Network Model enables greatly improved network security when compared with current distributed computing security techniques.

FIG. 2 (a) illustrates an example of one type of Workflow wherein Workflow 500 comprises N number of DIMEs 300, represented by the circles D1, D2, up to DN. The Workflow illustrated in FIG. 2 (a) is used herein only for the purpose of illustration and is not intended to limit the scope of the invention.

Referring to FIG. 2 (a), and for the purpose of illustrating that the DIMEs 300 in the Workflow 500 need not be co-located, D1 through DN are represented as geographically separated by a LAN or WAN 600 between D4 and D5. The execution of Workflow 500 may be initiated with the DIME Execution of D1 depending on pre-programmed polices and initial input data. The result of the DIME Execution of D1 may then be used in the simultaneous DIME Execution of D2 and D3. The result of the simultaneous DIME Execution of D2 and D3 may then be used in the DIME Execution of D4.

This process continues with the Workflow 500 and may include, following the DIME Execution of D(N−1), an additional DIME Execution, or Executions, of D2 only or of D2 simultaneously with D3 and D5 or any other combination of one or more of D1 D2 . . . DN in the Workflow 500

FIG. 2 (b) illustrates an example of a type of Workflow 800 having series and parallel DIME Executions. The Workflow 800 divides into Path 01, Path 02, and Path 03. Paths 01 and 02 may be each separated by LAN or WAN 825 to illustrate that the DIMEs 300 in these Paths need not be co-located.

A preferred embodiment of the New Network Model comprises a set of four signaling services to the network. They are designated as Supervisory Services, Addressing Services, Alerting Services, and Mediation Services and collectively referred to hereinafter as DIME Signaling Services. Other embodiments of the invention may use one or more signaling services including, but not limited to, one or more of the DIME Signaling Services referred to above as addressing, alerting, supervising, or mediating services.

The DIME Signaling Services are implemented by instantiating four TOPs into the MICE Elements 270 of four respective DIMEs 300. Each TOP is programmed to implement one of the DIME Signaling Services. The four DIMEs are illustrated in FIG. 2 (a) where they are designated and numerated as "DIMESp" 410, "DIMEAm" 420, "DIMEAI" 430, and "DIMEMe" 440 corresponding to the Supervisory Services, Addressing Services, Alerting Services, and Mediation Services, respectively, that they implement. DIMESp 410, DIMEAm 420, DIMEAI 430, and DIMEMe 440 are individually referred to as a "Signaling DIME" and collectively as a set of "Signaling DIMEs" 400.

In a preferred embodiment of the Workflow, the Workflow includes the Signaling DIMEs 400. The Signaling DIMEs 400 provide management services to all DIMEs 300 in the Workflow through communication, command, and control messages sent and received via the Signaling Channel 110. In addition, the Signaling DIMEs 400 may provide the management services through the results of DIME Executions of the Signaling DIMEs 400 via the Data Channel 130, as illustrated in FIGS. 1 and 2 (a). Signaling DIME instantiation and the functions each Signaling DIME is programmed to perform are described below.

Supervisory Services are implemented by the DIMESp 410 which, in the preferred embodiment, is the first Signaling DIME to be instantiated. A DIMESp 410 is instantiated via signals to its DM Element 210. A TOP appropriate for implementing the Supervisory Services is downloaded to the MICE Element 270 of the DIMESp 410 on command from its C Element 230. The DIMESp 410 causes the instantiation of the other Signaling DIMEs 400 by sending the appropriate signals from its TOP to the operating system via the Interface Channel 120. This process includes the instantiation of the FCAPS Elements 220, 230, 240, 250, 260 of each of the other Signaling DIMEs 420, 430, 440. Instantiation includes application of polices appropriate for each Signaling DIME's 410 420 430 440 type and specific functions. One of the policies instantiated into the C Elements 230 of each Signaling DIME 410, 420, 430, 440, is to issue commands to load the appropriate TOP into its MICE Element 270. Addressing is accomplished by messaging among the DM Elements 210 of the Signaling DIMEs 400 and the DIMEAm 420, as described below.

After instantiation of the Signaling DIMEs 400, the DIMESp 410 manages the Signaling DIMEs 400 to assure that they operate properly. The management functions performed by the DIMESp 410 comprise monitoring the F Elements 220 of the Signaling DIMEs 400, including the F Element 220 of the DIMESp 410. In addition, the management functions performed by the DIMESp 410 comprise keeping logs of error events reported by the Signaling DIMEs 400. Upon receiving an error message from a Signaling DIME 400, the DIMESp 410 causes actions to be taken to correct the error is according to polices programmed into its TOP.

The DIMESp 410 also resolves conflicts arising from the inability of a Signaling DIME to execute according to its programmed polices, even though its Elements might be operating without error. In such occurrence, the TOP of the conflicted Signaling DIME is programmed to send a notification message specifying the type of conflict, to the TOP of the DIMESp 410, via the Data Channel 130. The TOP of the DIMESp 410 causes actions to be taken to resolve the conflict according to polices in its TOP. The actions are implemented through the appropriate signals via the Data Channel 130. They include, but are not limited to, re-starting damaged or previously deleted Signaling DIMEs and causing a dynamic reconfiguration of the TOP in a Signaling DIME 410 420 430 440. The action is logged by the DIMESp 410.

In the preferred embodiment, the DIMEAm 420 implements Addressing Services. The TOP of the DIMEAm 420 comprises an address management service program that assigns a unique DIME Identifier to each DIME 300 at the time of the instantiation of the DIME 300 and stores the address, comprising the DIME 300 name, DIME IP address and DIME Element Port numbers, sent to it by the instantiated DIME 300, together with the DIME Identifier in an address register resident in the address management service. The set of addressing information comprising the DIME 300 name, DIME IP address, DIME Element Port numbers, and DIME Identifier is sent back to the DM Element 210 of the DIME 300 being instantiated and implemented in the DIME Elements. The address management service program further provides the DIME network with address directory services that include making the set of addressing information available to the DIMEs 300 in the DIME network. The set of addressing information is exchanged between the DIMEAm 420 and the DM Element 210 of the DIME 300 via the Signaling Channel 110. After instantiation, address directory services, such as an address request, are provided to the DIME 300 through messaging between the TOP of the DIMEAm 420 and the TOP of the DIME 300 via the Data Channel. The set of addressing information uniquely identifies each DIME Element in the DIME Network. The set of addressing information is referred to herein as a "Global Address".

Alerting Services are implemented by the DIMEAI 430. The F Element of the DIMEAI 430 monitors messages sent from the F Elements 220 of the DIMEs 300 via the Signaling Channel. Error messages, or the lack of the heartbeat signal sent from the F Element 220 of the DIME 300 indicating that the DIME 300 is not operational, received by the DIMEAI 430 are logged and sent to the MICE Element 270 of the DIMEAI 430. The TOP in the MICE Element 270 of the DIMEAI 430 sends a message describing the type of error to the TOP of the DIMEMe 440 via the Data Channel 130.

Mediation Services are implemented by the DIMEMe 440. The DIMEMe 440 receives error and loss of operation messages from the DIMEAI 430, via the Data Channel 130, and, according to the polices of the TOP of the DIMEMe 440, initiates appropriate actions to correct the problems. The actions are initiated through messages exchanged between the C Element 230 of the DIMEMe 440 and the C Elements 230 of the DIMEs 300 required to implement the actions. The messages are exchanged via the Signaling Channel 110. Actions initiated by the DIMEMe 440 include, but are not limited to: re-starting damaged or previously deleted DIMEs 300, and replacing an erroneously operating TOP in the Workflow with a duplicate TOP programmed to perform the same function.

Replacing or adding a DIME 300 to the Workflow may be accomplished by the use of a DIME 300 instantiated without a TOP, referred to as a Spare DIME, The DIMEMe 440 causes the Spare DIME to load an appropriate TOP into the Spare DIME's MICE Element 270 through messages delivered via the Signaling Channel 110. The DIMEMe 440 further causes the malfunctioning DIME 300 to be replaced in the Workflow by the Spare DIME comprising the appropriate TOP. The Signaling Channel 110, the Interface Channel 120, the Data Channel 130, and the Signaling DIMEs 400 comprise the Signaling Infrastructure.

The DIMEs 300 in the Workflow need not be co-located. They may reside in geographically different locations and may be connected to the Workflow through LANs and, or, WANs. A Workflow with its DIMEs 300 distributed over several locations on a computing network may have, at one or more of these locations, a sub-set of the DIMEs 300 comprising the Workflow, a Sub Workflow. The Sub Workflows are parts of the Workflow and therefore have positions in the DIME Execution of the Workflow. It may be desirable, but not necessary to the application of the invention, to also have a set of Signaling DIMEs 400 to manage the DIMEs 300 in a Sub Workflow, the set of Signaling DIMEs 400 referred to as a set of Sub Signaling DIMEs. In a preferred embodiment of the invention, the Sub Signaling DIMEs associated with the Sub Workflow directly manage the DIMEs 300 in the Sub Workflow, and the Signaling DIMEs 400 of the Workflow manage the set or sets of Sub Signaling DIMEs as well as the DIMEs 300 that are in the Workflow, but not part of a Sub Workflow. The Signaling DIMEs 400 of the Workflow interact directly with the Sub Signaling DIMEs and not directly with the DIMEs 300 in the Sub Workflow.

The management functions performed by, and the interactions among the Sub Signaling DIMEs and among the Sub Signaling DIMEs and the DIMEs 300 in the Sub Workflow are the same as those described earlier herein for the Signaling DIMEs 400 and the Workflow they would manage.

The Sub Signaling DIME that implements the Addressing Services for the Sub Workflow has local naming service and address manager programs residing in its TOP which provide address management services to the DIMEs in the Sub Workflow. The TOP sends its local addressing information to the DIMEAm 420 in the set of Signaling DIMEs 400 where it is stored in a Workflow wide address register and made available to any DIME 300 in the Workflow, including those in the Sub Workflows.

Figure 3:
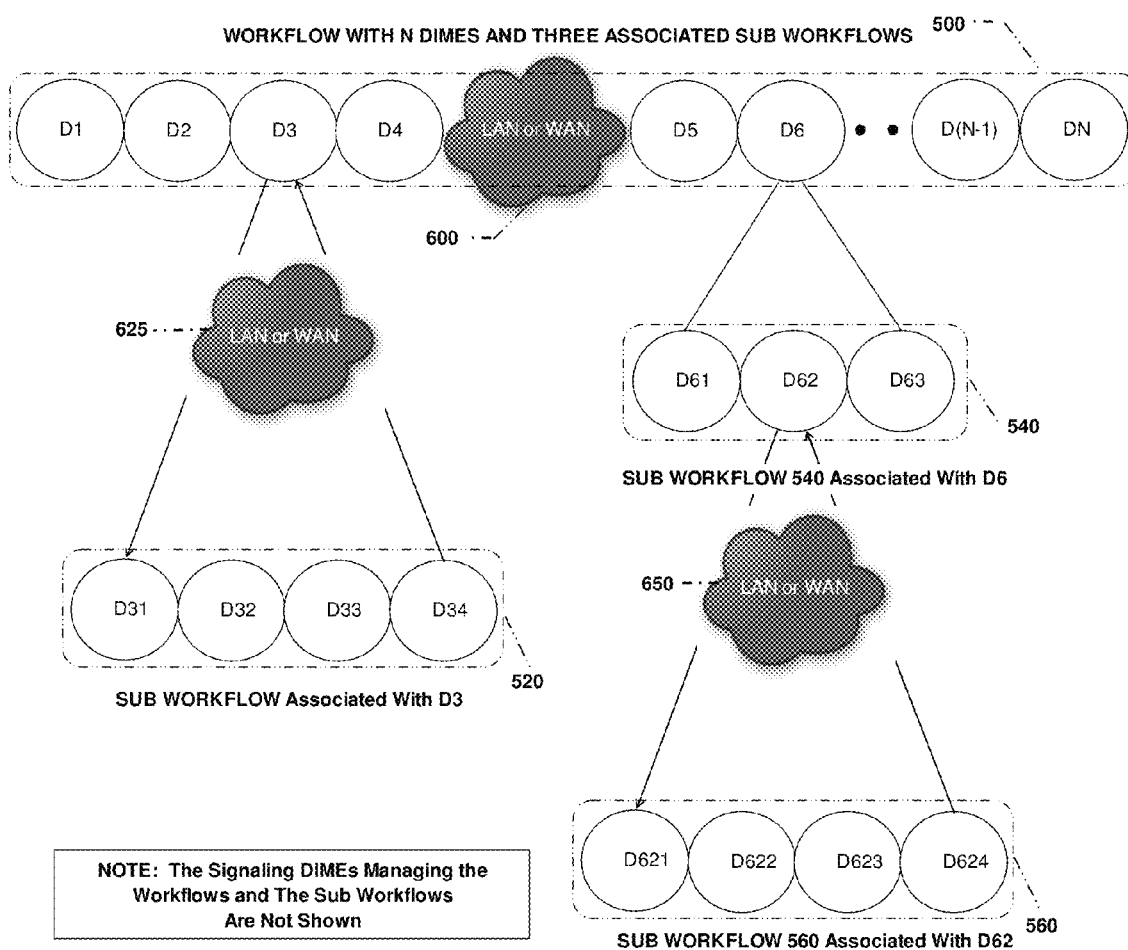
FIG. 3 illustrates a Workflow Hierarchy comprised of a Workflow of N number of DIMEs and several Sub Workflows.

The concept of a Workflow Hierarchy is illustrated by way of example in FIG. 3, where similar elements are referred to by common reference numerals. Such example is set forth for purposes of illustration only and is not intended to limit the scope of the invention.

Although sets of Signaling DIMEs 400 associated with the Workflow 500, illustrated in FIG. 2 (a), and with one or more of the Sub Workflows would be included in any Workflow Hierarchy, they are not shown in the illustration of FIG. 3 for purposes of clarity and simplicity. Sub Signaling DIMEs associated with the Sub Workflows 520, 540, and 560 are similarly not shown for purposes of clarity and simplicity in the illustration of FIG. 3.

As in FIG. 2 (a), FIG. 3 illustrates a Workflow 500 comprising N DIMEs, represented by D1, D2, up to DN. The DIMEs may be geographically separated and connected by a LAN or WAN 600. For example, referring to the Workflow 500, at some point in the DIME Execution of D3, DIME Executions of the Sub Workflow 520, which is geographically separated from D3 by another LAN or WAN 625, will be initiated and D31, D32, D33, and D34 will be executed according to the order illustrated for Workflow 520. When the coordinated DIME Executions of Sub Workflow 520 and D3 are completed, the DIME Execution of D4, or the DIME Execution of D4 and D5 at the same time, is initiated. The process continues until the DIME Execution of D6 which initiates the DIME Executions of D61, D62, and D63, according to the order illustrated for Sub Workflow 540.

When the DIME Executions of Sub Workflow 540 reaches D62, the DIME Execution of D62 initiates the DIME Executions of D621, D622, D623, and D624 in the Sub Workflow 560 according to the order illustrated for the Workflow 560, which is geographically separated from D62 by another LAN or WAN 650.

The DIME Executions of D621, D622, D623, and D624 in Sub Workflow 560 proceed according to the order illustrated. At some point in this process the DIME Execution of D63 is initiated and, the coordinated DIME Executions of the DIMEs in the Sub Workflows 540 and 560 and of D6 then proceed according to the order illustrated until the coordinated DIME Executions of the DIMEs 300 in the Workflow 500 are completed.

FIG. 2 (b) illustrates an example of series and parallel DIME Executions in a Workflow 800 having a set of Signaling DIMEs 900, and in a Sub Workflow 850 having a set of Sub Signaling DIMEs 950. The Workflow 800 divides into Path 01, Path 02, and Path 03. Paths 01 and 02 are each separated by LAN or WAN 825 to illustrate that is the DIMEs 300 in the paths of a Workflow 800 with multiple paths need not be co-located. Path 011 and Path 012 of Sub Workflow 850 are each separated by LAN or WAN 875 to illustrate that the DIMEs in the paths of a Sub Workflow need not be co-located. The Signaling DIMEs 900 associated with the Workflow 800 and the Sub Signaling DIMEs 950 associated with the Sub Workflow 850 are illustrated as separated by LAN or WAN 925 and 975 respectively to illustrate that neither the Signaling DIMEs 900 nor the Sub Signaling DIMEs 950 need be co-located.

A distributed computing network architected with the New Network Model may have more than one Workflow operating at the same time, each Workflow comprised of a set of Signaling DIMEs. Each Workflow may have more than one Sub Workflow, and some or all of the Sub Workflows may have their own set of Sub Signaling DIMEs. In a preferred embodiment of the invention, there would be a global set of signaling DIMEs, the "Global Signaling DIMEs", which manages the sets of Signaling DIMEs for all the Workflows. The Signaling DIMEs for each Workflow in turn manage the Sub Signaling DIMEs of their Workflow, forming a Signaling DIME management hierarchy. A practitioner skilled in the art will recognize this as a hierarchy of Workflows and their associated sets of Signaling DIMEs, and that the hierarchy may be further extended to additional levels of Workflow and Sub Workflow with associated sets of additional Signaling DIMEs and, as required or desirable, additional sets of Sub Signaling DIMEs.

We claim:

1. A distributed computing network, comprising:
a plurality of interconnected computing devices, each computing device having one or more central processing units and one or more electronic data storage devices, the computing devices each configured as a respective distributed intelligent managed entity (DIME), each DIME comprising:
a plurality of programs (DIME programs) implementing functional management services, one of said DIME programs comprising a configuration program;
a task oriented program (TOP) having a set of policies, the policies specific to the TOP, that cause the TOP to accomplish a specific computational task necessary to a desired performance of a portion of the distributed computing network;
a DIME management program (DM) that manages instantiation of, and communications among, the DIME programs;
a managed intelligent computing entity (MICE) program configured to load, execute, and control the TOP, wherein the configuration program directs the MICE to load, unload, execute, stop execution of, or change the polices of the TOP; and
one or more communication channels accessible by each of the plurality of DIME programs implementing functional management services and the MICE, the communication channels providing exchange of communication, command and control signals among the DIME programs implementing functional management services within each respective DIME to cause the DIME programs implementing functional management services to provide functional management services to the TOP included in each respective DIME in accordance with the polices specific to each respective TOP, wherein the one or more communication channels comprises a signaling channel providing data exchange between and among neighboring DIMEs in the distributed computing network.

2. A network according to claim 1 wherein the one or more communication channels further comprise an interface channel, and a data channel; the interface channel providing data exchange among the DIME programs, and the data channel providing data exchange among the MICE and TOP programs resident in neighboring DIMEs.

3. A network according to claim 1 wherein at least one of the functional management services comprises providing monitoring of the DIME for erroneous behavior, providing reports on monitored events, maintaining a log of monitored events, and in the absence of erroneous behavior producing a signal indicating that the DIME is performing acceptably.

4. A network according to claim 1 wherein at least one of the functional management services comprises providing monitoring of the DIME for use and time duration of use, providing reports on such use, and maintaining a log of such use.

5. A network according to claim 1 wherein at least one of the functional management services comprises: (a) providing monitoring of DIME resource utilization comprising computing device cycles, data storage usage, data storage capacity, throughput, and network bandwidth, (b) providing reports on the utilization, and (c) maintaining a log of the utilization.

6. A network according to claim 1 wherein at least one of the functional management services comprises providing authentication, authorization, and integrity of information sent to and from the DIME.

7. A network according to claim 4 wherein the reports and the log are used for billing purposes.

8. A network according to claim 5 wherein the reports and the log are used for billing purposes.

9. A network according to claim 5 wherein the reports and the log are used for optimizing performance of the network.

10. A network according to claim 6 wherein the at least one of the functional management services encrypts and decrypts information exchanged with the DIME programs.

11. A network according to claim 6 wherein the at least one of the functional management services encapsulates and decapsulates information exchanged with the DIME programs.

12. A network according to claim 1 wherein the network further comprises one or more Workflows, each Workflow comprising a set of one or more DIMEs wherein a respective TOP of a respective DIME in the set executes in coordination with respect to execution of other TOPs of other DIMEs in the set to achieve a certain outcome.

13. A network according to claim 12 wherein the coordinated executions comprise simultaneous execution of more than one TOP.

14. A network according to claim 12 wherein the coordinated executions comprise execution of the TOPs of the DIMEs in the set in series or parallel combinations.

15. A network according to claim 12 wherein the DIMEs of the set reside in one or more locations.

16. A network according to claim 12 wherein the set of DIMEs of the Workflow are connected through one or more LANs or WANs.

17. A network according to claim 1 wherein the network further comprises an Addressing DIME, the Addressing DIME comprising an address register, the address register comprising a unique identifier assigned to each DIME comprising the network, and addressing information for each DIME comprising the network.

18. A network according to claim 1 wherein the network further comprises an Alerting DIME, the Alerting DIME configured to monitor respective ones of DIME programs configured as Fault elements and maintain a log.

19. A network according to claim 1 wherein the network further comprises a Mediating DIME, the Mediating DIME configured to receive messages from an Alerting DIME, and according to polices of its respective TOP, initiate actions to correct errors and loss of operation.

20. A network according to claim 1 wherein the network further comprises a Supervising DIME, the Supervising DIME providing instantiation of DIMEs comprising an Addressing DIME, an Alerting DIME, or a Mediating DIME, and monitoring, logging, and correcting errors in the operation of the DIMEs instantiated by the Supervising DIME according to preprogrammed policies.

21. A network according to claim 1 wherein the network further comprises a set of Signaling DIMEs, the set of Signaling DIMEs comprising an Addressing DIME, an Alerting DIME, a Mediating DIME, and a Supervising DIME,
 a. the Supervising DIME instantiating other Signaling DIMEs in the set of Signaling DIMEs; managing the Signaling DIMEs by monitoring Fault (F) elements of the DIMEs in the set of Signaling DIMEs, maintaining an error log, causing actions to be taken to correct an error according to polices programmed into a respective TOP of the Supervising DIME;
 b. the Addressing DIME assigning a unique DIME Identifier to each of the DIMEs and each of the Signaling DIMEs comprising the network, storing the unique DIME Identifier and DIME addressing information comprising a DIME name, DIME IP address, and DIME Element designations in an address register resident in a respective TOP of the Addressing DIME, and providing the addressing information stored in its address register to the DIMEs comprising the network;
 c. the Alerting DIME monitoring the F elements of the DIMEs comprising the network and maintaining a log; and
 d. the Mediating DIME initiating actions, according to policies of its respective TOP, to correct errors and losses of operation upon receiving error and loss of operation messages from the Alerting DIME.

22. A network according to claim 12 wherein the one or more Workflows each further comprise one or more sets of Signaling DIMEs, the set providing signaling services to the Workflows, or to a portion of the Workflows.

23. A network according to claim 22 wherein at least one of the Workflows further comprises a set of Workflow Signaling DIMEs providing the signaling services to the sets of Signaling DIMEs comprising the at least one Workflow.

\* \* \* \* \*